Dec. 15, 1925.
O. A. WEBSTER
WORK TESTING FIXTURE
Filed April 1, 1921
1,565,695
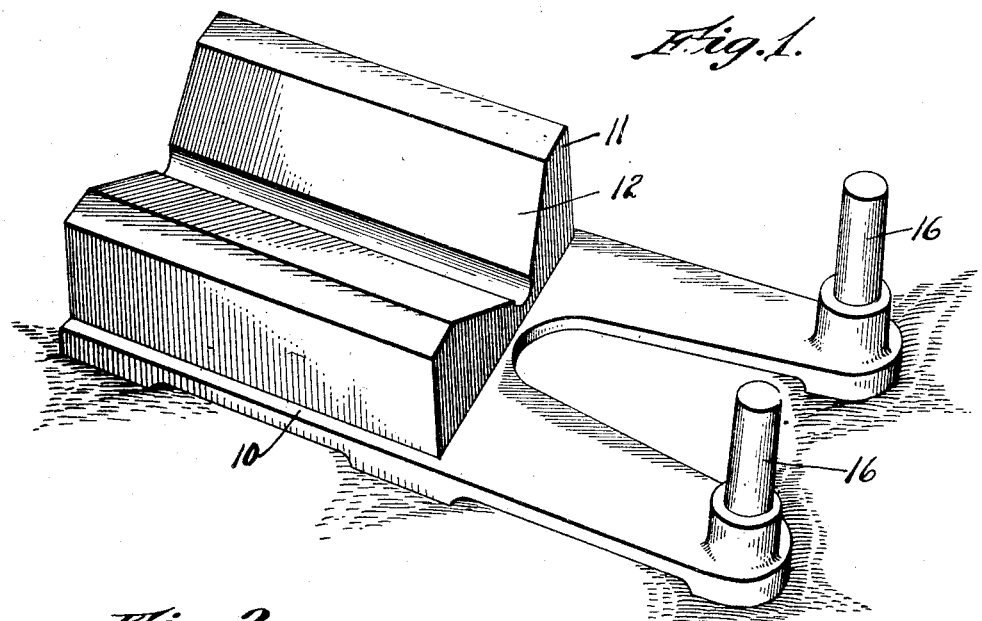
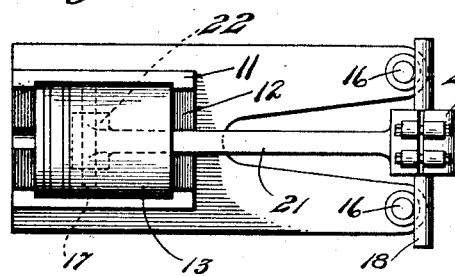
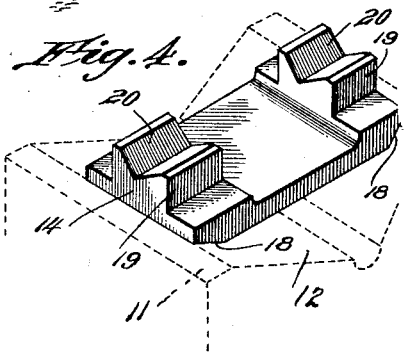
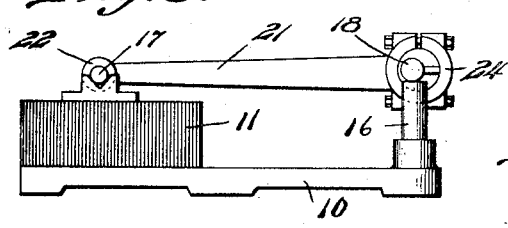
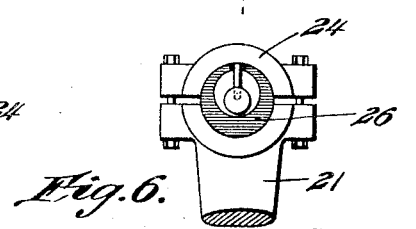
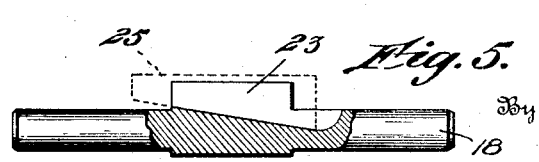
Inventor
Oscar A. Webster
By Howard E. Barlow
Attorney Patented Dec. 15, 1925.

1,565,695

UNITED STATES PATENT OFFICE.

OSCAR A. WEBSTER, OF EDGEWOOD, RHODE ISLAND, ASSIGNOR TO ALLEN WRENCH & TOOL COMPANY, OF PROVIDENCE, RHODE ISLAND, A CORPORATION OF RHODE ISLAND.

WORK-TESTING FIXTURE.

Application filed April 1, 1921. Serial No. 457,601.

*To all whom it may concern:*

Be it known that I, OSCAR A. WEBSTER, a citizen of the United States, residing at Edgewood, in the county of Providence and State of Rhode Island, have invented certain new and useful Improvements in Work-Testing Fixtures, of which the following is a specification.

This invention relates to work-testing fixtures to determine the alignment of the different parts of a piece of work; and has for its object to provide a simple form of fixture for this purpose adapted more particularly for testing engine connecting rods to determine the alignment of its bearings; that is, whether or not the rod has been bent to cause the axes of its bearing to converge, or to determine whether or not these bearings have been twisted to throw their axes out of a common plane; also to test for trueness of the combined piston and connecting rod when the two are assembled.

A further object of the invention is to provide means in the fixture whereby it readily lends itself to the testing of such work of different sizes and that without being obliged to adjust its parts.

With these and other objects in view, the invention consists of certain novel features of construction, as will be more fully described, and particularly pointed out in the appended claims.

In the accompanying drawings.

Figure 1 is a perspective view of my improved testing device.

Figure 2 is a plan view showing the assembly of the piston and connecting rod mounted to be tested for accuracy of the crank bearing of the rod relative to the alignment of the piston and the bearing of the rod therein.

Figure 3 is a side elevation showing an auxiliary bearing member mounted in the body of the fixture to receive the wrist pin of the connecting rod and showing the outer end of the rod in position to be tested for a twist in the rod.

Figure 4 is a perspective view of the auxiliary wrist pin bearing member, the dotted lines indicating the V-shaped body in which said member is adjustly mounted.

Figure 5 is a detail partly in section of the aligning bar with the adjustable tapered binding key mounted therein.

Figure 6 is an end view of the crank shaft bearing end of the connecting rod showing the aligning bar mounted therein.

With reference to the drawings, 10 designates the base plate of the frame on which is mounted the body portion 11 thereof. The face of this body is provided with a longitudinally-disposed V-shaped groove 12 which serves both to support the piston 13, see Figure 2, and also as a support for the wrist-pin bearing member 14, presently described, both of which may be adjusted longitudinally in said groove to accommodate connecting rods of different lengths.

A portion of the base plate 10 is forked as at 15 and is arranged to extend forwardly from the body 11 and at the ends of these forked members is located a pair of upright spaced apart standards 16 of uniform diameter and of identical form and size and so located that a plane passing through the axial centers of both standards will be exactly at a right angle to the plane of either of the inclined finished working surfaces of the longitudinal groove 12 in the body, and the surfaces of these standards provide finished testing surfaces, as illustrated in Figure 2, which are in a common plane, which plane is also at right angles to said inclined surfaces, and the upper ends of these standards are finished to be in a plane parallel with that of the finished surfaces of the top edges of the body and also parallel to the apex of the V-shaped surface of the auxiliary bearing member 14.

When testing for alignment of the wrist pin 17 with the bar 18 in the crank bearing of the connecting rod 21 the auxiliary bearing member 14 is employed, the same being adapted to set transversely to and be seated in the groove 12 and is provided with inclined bottom surfaces 28 to fit the finished V-surfaces of groove 12. On this member are mounted two spaced apart bosses 19 grooved at 20 in their upper faces to receive the opposite ends of the connecting rod wrist pin 17, the space between these beai ings being to receive the head 22 of the rod.

In testing the rod I provide an aligning bar 18 with an enlarged portion 23 which in some cases may nearly fit the crank bearing 24, an adjustable tapered key 25 being mounted in a keyway in this enlarged portion to bind the bar in this bearing 24 and when the bore of the bearing is too large for this enlarged portion a second bushing member 26 is mounted on the first enlargement 23 to fill the larger bore.

In testing for a bent connecting rod the piston is usually positioned in the groove 12, the aligning bar 18 being placed in the bearing 24, the piston is then slid along the groove to bring the bar against the sides of the standards 16 as shown in Fig. 2 and if the bar touches both standards the test shows the rod to be straight and the bearings true, but if the bar touches but one standard the rod is bent and its bearings untrue, in which latter case the rod is straightened until it shows true by the test.

In testing for a twist in the rod, the wrist pin is placed in the transverse bearing member 14 and the aligning bar is caused to rest upon the ends of the standards, as shown in Figure 3, and if this bar touches on the ends of both standards while the wrist pin touches in both of its bearings 21 then the test shows that the bearings are true; if all four points do not touch then the rod is taken out and twisted until the test shows the bearings to be true.

The device is extremely simple and practical in construction and by its use connecting rods or other work which it is adapted to receive may be quickly and accurately tested for accuracy, the same being so arranged as to receive work of different dimensions without the operator being obliged to adjust any of its working parts.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A work-testing fixture comprising a frame having an elongated body portion with a finished testing surface disposed longitudinally thereof for supporting one end of the work to be tested, and a pair of cooperating spaced-apart standards on said frame having testing surfaces extending at right angles to the testing surface of said body portion and spaced therefrom in the direction of its length.

2. A work-testing fixture comprising a base or frame carrying at one end an elongated rest block with longitudinally disposed finished surfaces lying in intersecting planes for supporting one end of the work to be tested, a pair of cooperating spaced apart standards supported on said base adjacent the other end thereof and having work-testing surfaces in a common plane at right angles to said finished surfaces for engaging another portion of the work.

3. A work-testing fixture comprising a base or frame having at one end an elongated rest block with a pair of spaced finished surfaces disposed longitudinally of said rest block, a work-supporting member having a finished surface mounted on the spaced finished surfaces of said rest block and provided with an elongated V-shaped finished surface for supporting one end of the work to be tested, and a pair of cooperating spaced apart members located adjacent the other end of said base and having testing surfaces set in a common plane which is parallel with the apex of the said V-shaped surface to support the opposite end of the work to test for tortional alignment of the engaging parts of the work.

4. A work-testing fixture comprising a frame having an elongated member with a V-shaped work supporting groove having finished testing surfaces disposed longitudinally thereof and a pair of cooperating spaced-apart testing standards on said frame spaced from one end of said grooved member and each having a testing surface in a common plane which is at a right angle to the plane of either of the supporting surfaces of said groove to test the alignment of different parts of the work.

5. A work-testing fixture comprising a base or frame having an elongated rest block with a pair of spaced apart finished surfaces in the same plane to serve as a rest for a portion of the work to be tested, and a pair of cooperating spaced-apart testing standards on said frame spaced from said block and each having a bearing surface disposed in a common plane which is parallel to that of said surfaces on said rest block whereby the opposite ends of the work are supported to test for tortional alignment of its bearings.

6. A work-testing fixture comprising a frame having at one end an elongated body member provided with a groove disposed longitudinally thereof, a rest member having a pair of V-shaped work-supporting surfaces and being longitudinally adjustably mounted in said groove, and a pair of cooperating spaced apart testing standards on said frame located near the other end thereof and having spaced apart cooperating bearing surfaces disposed in a common plane which is parallel with the apex of said V-shaped work-supporting surfaces on said rest member, whereby the opposite ends of the work are supported independently to test for tortional alignment.

In testimony whereof I affix my signature.

OSCAR A. WEBSTER.